United States Patent
Markov et al.

(10) Patent No.: US 12,117,846 B2
(45) Date of Patent: Oct. 15, 2024

(54) METHOD AND APPARATUS FOR MULTI-MACHINE COLLABORATIVE FARMING

(71) Applicant: Topcon Positioning Systems, Inc., Livermore, CA (US)

(72) Inventors: Dimitre Markov, Holden Hill (AU); John Boal, Mawson Lakes (AU); Jonathan Targett, Gawler East (AU); Lyndon Whaite, Uraidla (AU); Stefan Stefanov, Shiedow Park (AU)

(73) Assignee: Topcon Positioning Systems, Inc., Livermore, CA (US)

( * ) Notice: Subject to any disclaimer, the term of this patent is extended or adjusted under 35 U.S.C. 154(b) by 236 days.

(21) Appl. No.: 17/015,109

(22) Filed: Sep. 9, 2020

(65) Prior Publication Data

US 2021/0089051 A1      Mar. 25, 2021

Related U.S. Application Data

(60) Provisional application No. 62/902,452, filed on Sep. 19, 2019.

(51) Int. Cl.
*G05D 1/00* (2006.01)
*A01B 69/04* (2006.01)
(Continued)

(52) U.S. Cl.
CPC ......... *G05D 1/0287* (2013.01); *A01B 69/008* (2013.01); *G06Q 10/06313* (2013.01); *H04W 84/18* (2013.01)

(58) Field of Classification Search
CPC ............. G06Q 10/06313; G06Q 10/06; G05D 1/0022; G05D 1/0088; H04W 4/005; G01C 21/34
(Continued)

(56) References Cited

U.S. PATENT DOCUMENTS

| | | | |
|---|---|---|---|
| 6,182,215 B1 * | 1/2001 | Tatebayashi | ....... H04N 21/4627 713/168 |
| 2003/0158745 A1 * | 8/2003 | Katz | ...................... G06Q 40/00 705/310 |

(Continued)

FOREIGN PATENT DOCUMENTS

| | | | | |
|---|---|---|---|---|
| AU | 2015255167 A1 * | 5/2016 | ............... | H04B 1/40 |
| JP | 2005340901 A | 12/2005 | | |

(Continued)

OTHER PUBLICATIONS

International Search Report and Written Opinion mailed Oct. 27, 2020, in connection with International Patent Application No. PCT/US2020/050464, filed Sep. 11, 2020, 13 pgs.

(Continued)

*Primary Examiner* — Hani M Kazimi
*Assistant Examiner* — Sanjeev Malhotra
(74) *Attorney, Agent, or Firm* — Chiesa Shahinian & Giantomasi PC

(57) ABSTRACT

A method for coordinating machines to perform a task includes establishing a plurality of communication channels between a plurality of agricultural machines located in a geographic area. Data pertaining to capabilities of each of the plurality of machines, and location in some cases, is received and a collaborative plan to complete a task using the plurality of machines is determined. At least a portion of the collaborative plan is transmitted to each of the plurality of machines. The collaborative plan can be based on the location and capabilities of each of the plurality of machines. The collaborative plan can include a plurality of operations for each of the plurality of machines to perform.

21 Claims, 8 Drawing Sheets

(51) Int. Cl.
*G06Q 10/0631* (2023.01)
*H04W 84/18* (2009.01)

(58) Field of Classification Search
USPC ........... 705/7.14, 7.16, 7.17, 7.26, 301, 310; 701/1, 25, 50; 709/204, 219; 370/252, 370/329; 713/168; 726/3
See application file for complete search history.

(56) References Cited

U.S. PATENT DOCUMENTS

| | | | |
|---|---|---|---|
| 2004/0174822 A1* | 9/2004 | Bui | H04L 9/40 370/252 |
| 2006/0287783 A1* | 12/2006 | Walker | H04Q 9/00 701/31.4 |
| 2007/0100669 A1* | 5/2007 | Wargin | G06Q 10/06316 705/7.26 |
| 2008/0091309 A1* | 4/2008 | Walker | B60R 25/102 701/1 |
| 2010/0287023 A1* | 11/2010 | Knobel | G06Q 10/06311 709/204 |
| 2012/0095651 A1* | 4/2012 | Anderson | G05D 1/0291 701/50 |
| 2013/0151421 A1* | 6/2013 | Van Der Ploeg | G06Q 10/06 705/301 |
| 2013/0254109 A1* | 9/2013 | Beiser | G06Q 20/40 726/3 |
| 2014/0035725 A1* | 2/2014 | Bruemmer | G05D 1/0274 340/8.1 |
| 2014/0156806 A1* | 6/2014 | Karpistsenko | G06Q 10/06 709/219 |
| 2014/0278662 A1* | 9/2014 | Reed | G06Q 50/08 705/7.17 |
| 2015/0100503 A1* | 4/2015 | Lobo | G06Q 10/103 705/301 |
| 2015/0177736 A1* | 6/2015 | Anderson | G05D 1/0242 701/25 |
| 2015/0339619 A1* | 11/2015 | Dumont | G06Q 10/1093 705/7.16 |
| 2016/0134994 A1* | 5/2016 | Kellner | H04L 67/12 370/329 |
| 2016/0189085 A1* | 6/2016 | Shidlaghatta | G06Q 10/063112 705/7.14 |
| 2017/0300540 A1* | 10/2017 | Karpistsenko | H04L 67/2885 |
| 2017/0336787 A1 | 11/2017 | Pichlmaier et al. | |
| 2018/0247234 A1* | 8/2018 | Crabtree | G06F 16/29 |
| 2018/0364688 A1* | 12/2018 | Sait | G05B 19/042 |
| 2019/0324972 A1* | 10/2019 | Karpistsenko | G06Q 50/02 |
| 2019/0326982 A1* | 10/2019 | Darby, III | H04W 24/02 |
| 2020/0150687 A1* | 5/2020 | Halder | G05D 1/648 |
| 2020/0295823 A1* | 9/2020 | Darby, III | H04W 24/08 |
| 2021/0011471 A1* | 1/2021 | Hurd | G05D 1/0016 |
| 2022/0164879 A1* | 5/2022 | Cella | G06F 16/2379 |
| 2022/0172208 A1* | 6/2022 | Cella | G06Q 30/0278 |
| 2022/0236709 A1* | 7/2022 | Cella | H04L 67/125 |

FOREIGN PATENT DOCUMENTS

| | | | |
|---|---|---|---|
| JP | 2006185136 A | * | 7/2006 |
| JP | 2018500655 A | | 1/2018 |

OTHER PUBLICATIONS

Edwards et al., "Multi-Machine Coordination: Scheduling Operations based on Readiness Criteria and using a Modified Tabu Search Algorithm," 2013, 4th IFAC Proceedings vols. vol. 46, Issue 18, pp. 191-195.

Matsuda et al., System Architect, 2019 Edition, 1st Edition, Japan, Shoeisha Co., Ltd., 2019, pp. 260-271.

Kinouchi et al., "Mobility strategy of dedicated intermediate nodes for QoS-based mobile wireless sensor networks", The Institute of Electronics, Information and Communication Engineers, 2012, 7 pgs. (including abstract translation).

Notice of Reasons for Refusal mailed Jul. 16, 2024 in connection with Japanese Patent Application No. 2022-512858, 8 pgs. (including translation).

* cited by examiner

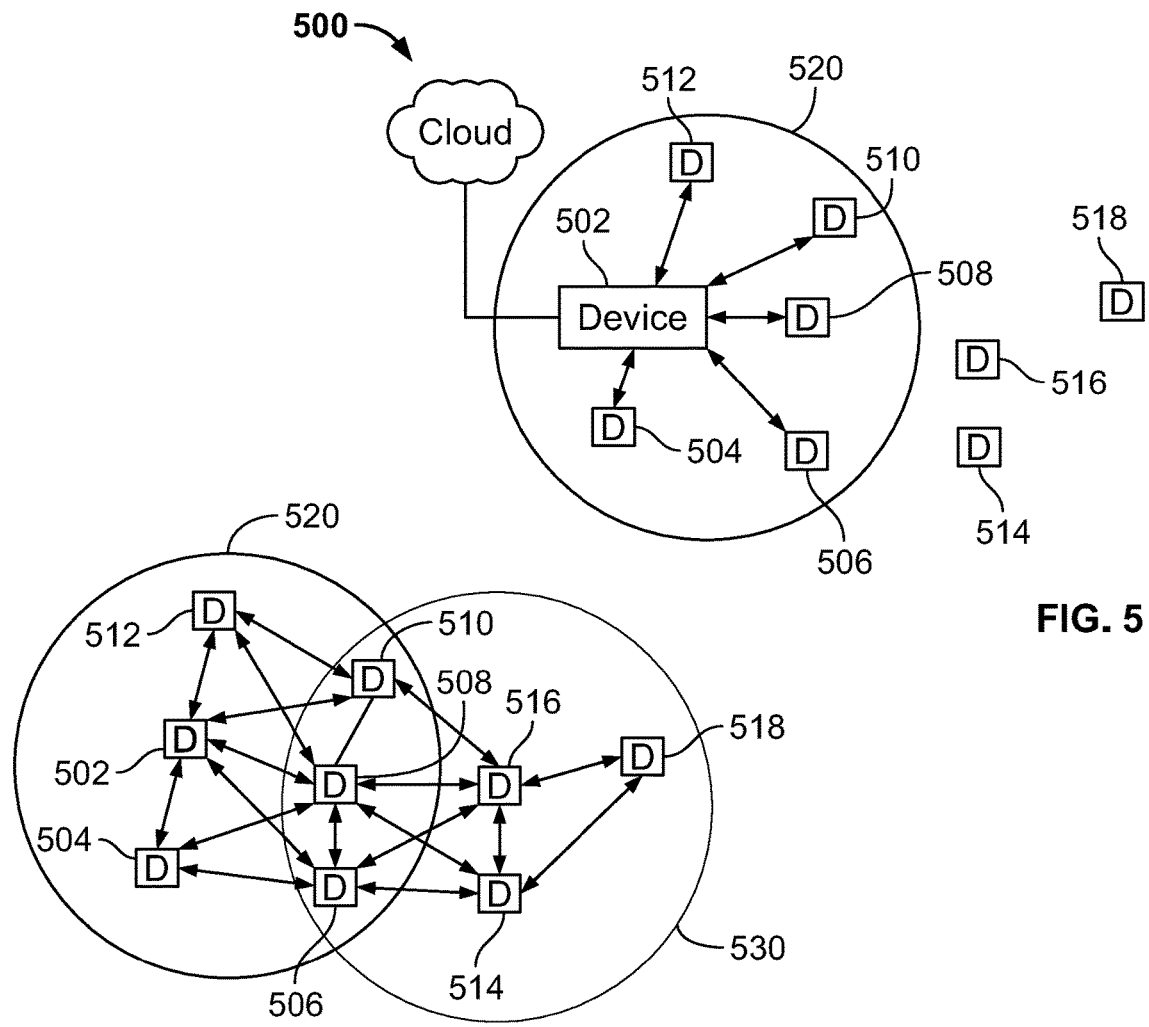
FIG. 5
FIG. 6
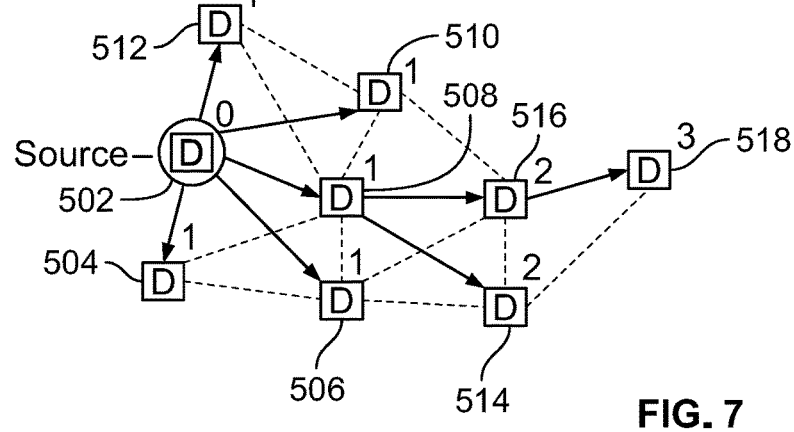
FIG. 7

METHOD AND APPARATUS FOR MULTI-MACHINE COLLABORATIVE FARMING

CROSS-REFERENCE TO RELATED APPLICATIONS

This application claims the benefit of prior-filed U.S. Provisional Patent Application No. 62/902,452 filed Sep. 19, 2019, the disclosure of which is incorporated herein by reference in its entirety.

FIELD OF THE DISCLOSURE

The present disclosure relates generally to multiple machines participating in the same task, and more particularly to multi-machine collaborative farming.

BACKGROUND

Farms, construction sites, and other locations typically require the performance of one or more tasks. Such tasks include, for example, harvesting of grain, applying a solid or liquid treatment to an area, or smoothing of a surface. Each of those tasks takes a particular amount of time to complete.

Machines are often used to complete such tasks. A single machine can quickly complete a task compared to use of manual methods. Multiple machines can be used to complete a task faster than a single machine can perform that task.

The use of multiple machines to complete a task can also result in a waste of time and/or resources. Multiple machines can cause the over application of treatments due to more than one machine applying a treatment to a particular area. Multiple machines may also cause a task to take a longer time to be completed than would be expected due to overlap of operations of the machines.

SUMMARY

A method for coordinating machines to perform a task includes establishing a plurality of communication channels between a plurality of machines located in a geographic area. Data pertaining to capabilities of each of the plurality of machines, and location of each of the plurality of machines in some cases, is received and a collaborative plan to complete a task using the plurality of machines is determined. At least a portion of the collaborative plan is transmitted to each of the plurality of machines. The collaborative plan can be based on the location and capabilities of each of the plurality of machines. The collaborative plan can include a plurality of operations for each of the plurality of machines to perform. The operations can include a path, a speed, and operation of an implement of a machine. The collaborative plan can include start and end times of machine operations and/or a period of time for a machine to operate.

BRIEF DESCRIPTION OF THE DRAWINGS

FIG. 5 shows a device in communication with other devices within a signal range;

FIG. 6 shows a set of connections among devices forming a multi-machine collaborative farming ("MMCF") network;

FIG. 7 shows a device transmitting information to other devices via a multi-hop network;

DETAILED DESCRIPTION

Figure 1:
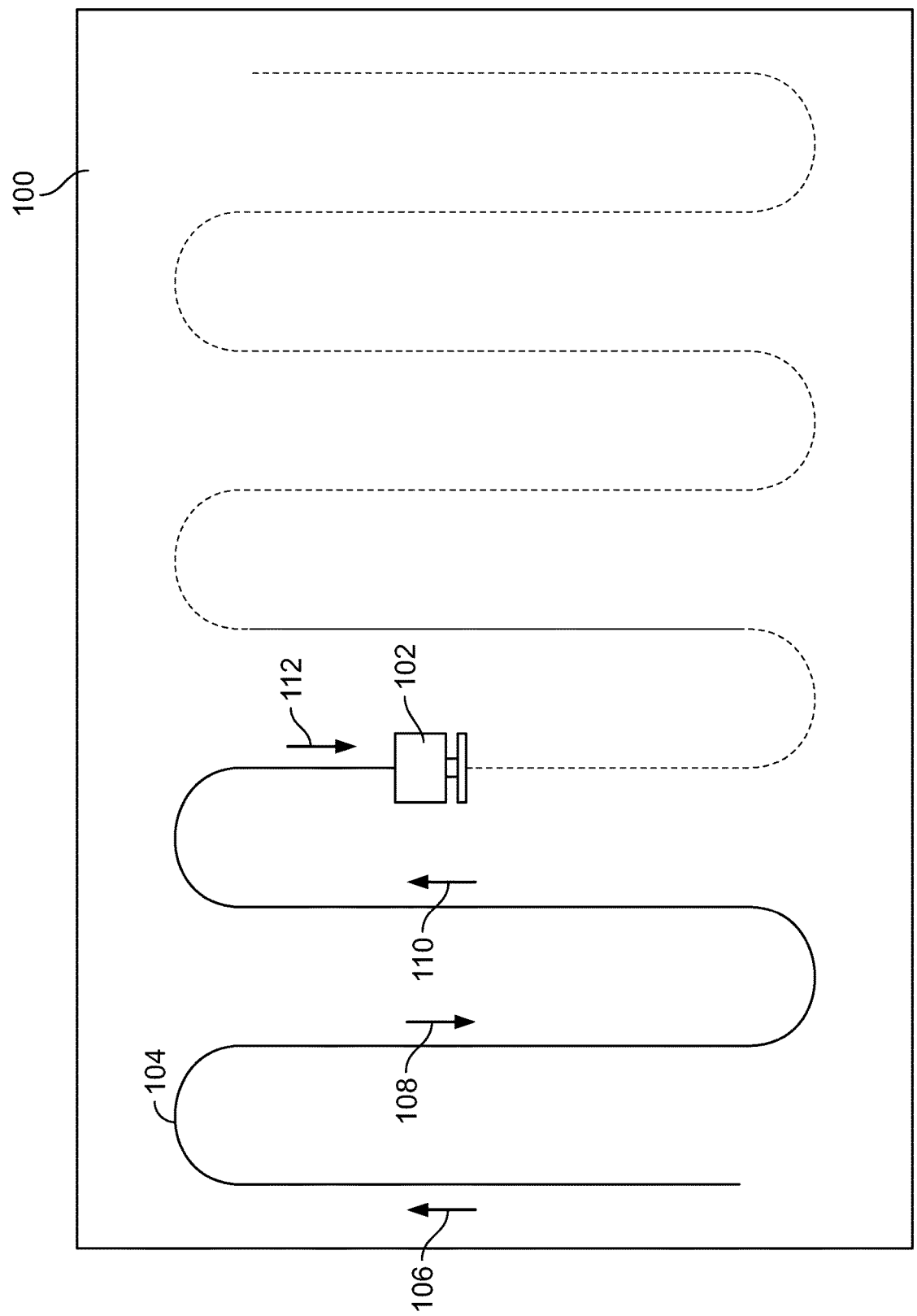
FIG. 1 shows a single machine performing a task.

FIG. 1 shows agricultural machine 102 performing a task in field 100. In this example, the task is the application of a liquid fertilizer. Machine 102 traverses path 104 by traveling from one end of field 100 to an opposite end in a first direction as indicated by arrow 106 and then turning and travelling in an opposite direction as indicated by arrow 108. Machine 102 continues traversing path 104 as shown by arrows 110 and 112. Machine is shown in FIG. 1 as having travelled over a portion of path 104 where the portion of the path traversed is shown as a solid line and the portion of the path yet to be traversed is shown as a dashed line.

Tasks can include one or more activities such as application of a liquid or solid material (e.g., fertilizer or pesticide), harvesting, planting, etc. As shown in FIG. 1, since only machine 102 is performing the task, completing it will require a certain amount of time. The amount of time required for a single machine to complete a task is based on several factors including, for example, the size of the field being operated on, the speed of the machine, how long it takes the machine to turn, the specific task being performed, etc.

Figure 2:
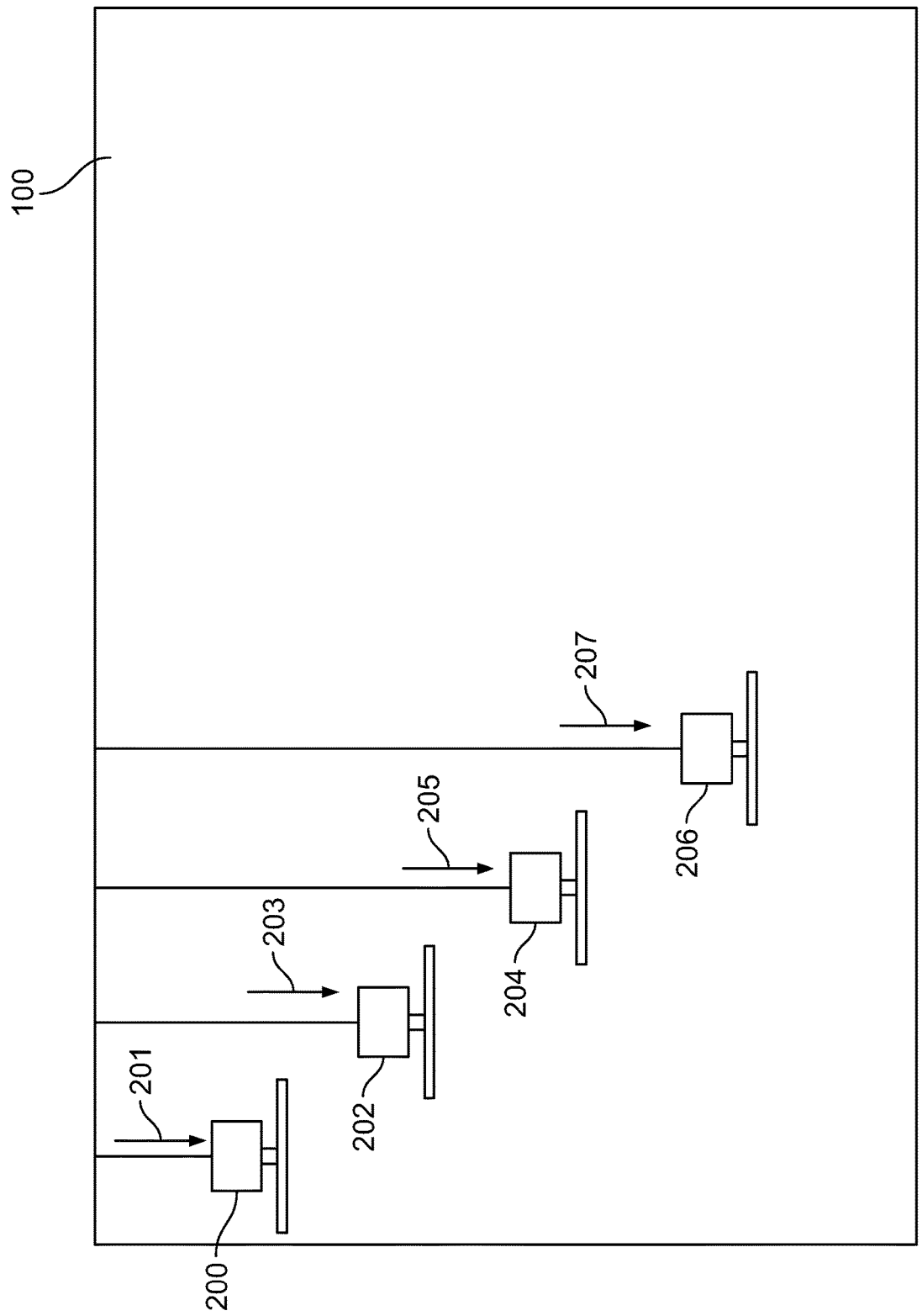
FIG. 2 shows multiple machines operating in a coordinated manner to complete a particular task.

Multi-machine collaborative farming ("MMCF") is a method that uses multiple machines operating in a coordinated manner to complete a particular task faster than a single machine can complete the task. Although many of the embodiments herein pertain to farming, the methods and techniques described can be applied to other tasks such as those pertaining to construction and/or surface modification. FIG. 2 depicts machines 200, 202, 204, and 206 coordinated to perform a task in field 100. The task being performed in FIG. 2 may be, for example, fertilization. As shown in FIG. 2, each of machines 200, 202, 204, and 206 are shown travelling in the same direction as indicated by arrows 201, 203, 205, and 207. The use of multiple machines as shown in FIG. 2 allows field 100 to be fertilized in much less time than that required to fertilize field 100 using a single machine. Multiple machines travelling over the field in a coordinated manner can complete a large portion of a task in a single pass. However, the use of multiple machines requires coordination among the machines. For example, as shown in FIG. 2, machines 200, 202, 204, and 206 are operated in a coordinated manner to travel in one direction spaced apart from one another both side-to-side and front-to-back. The speed and direction of each of machines 200, 202, 204, and 206 are controlled to maintain the spacing. Coordination is necessary to prevent undesirable operation, such as duplication of effort and/or over application of seeds or products, and to enable efficient completion of a task.

Figure 3:
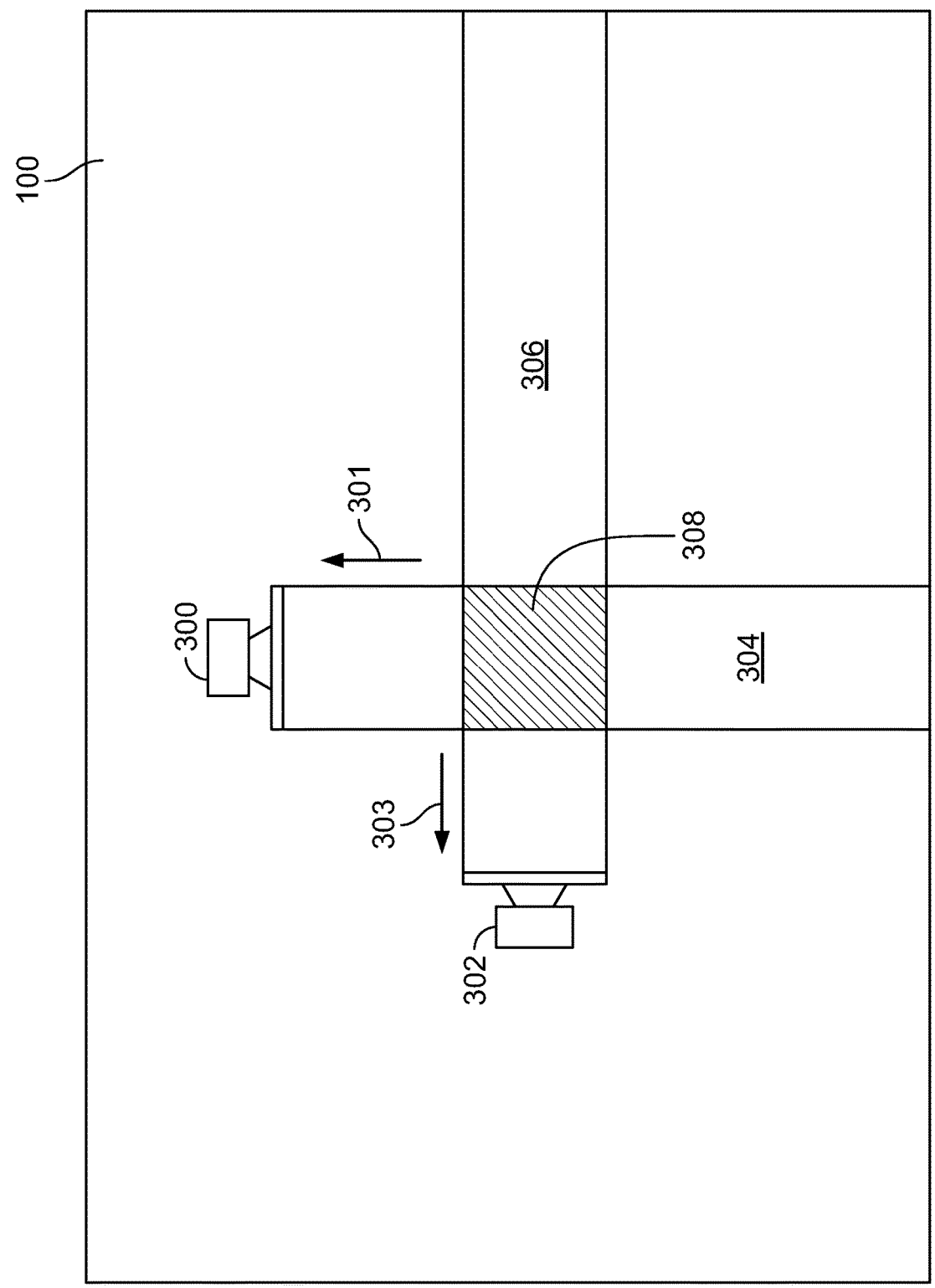
FIG. 3 shows how multiple machines working in a field may cause overlap of operations.

FIG. 3 depicts fluid application machines 300 and 302 operating in field 100. Machine 300 is shown moving in the direction indicated by arrow 301 and has applied liquid fertilizer to area 304. Machine 302 is shown moving in the direction indicated by arrow 303 and has applied liquid fertilizer to area 306. The paths of machines 300 and 302 have overlapped at area 308. Unless the operation of machines 300 and 302 are coordinated, area 308 will have twice the amount of liquid fertilizer applied to it because both machines 300 and 302 will apply the liquid fertilizer to area 308. In one embodiment, a method for multi-machine collaborative farming is used to coordinate operation of multiple machines performing a task in order to prevent such undesirable outcomes.

Figure 4:
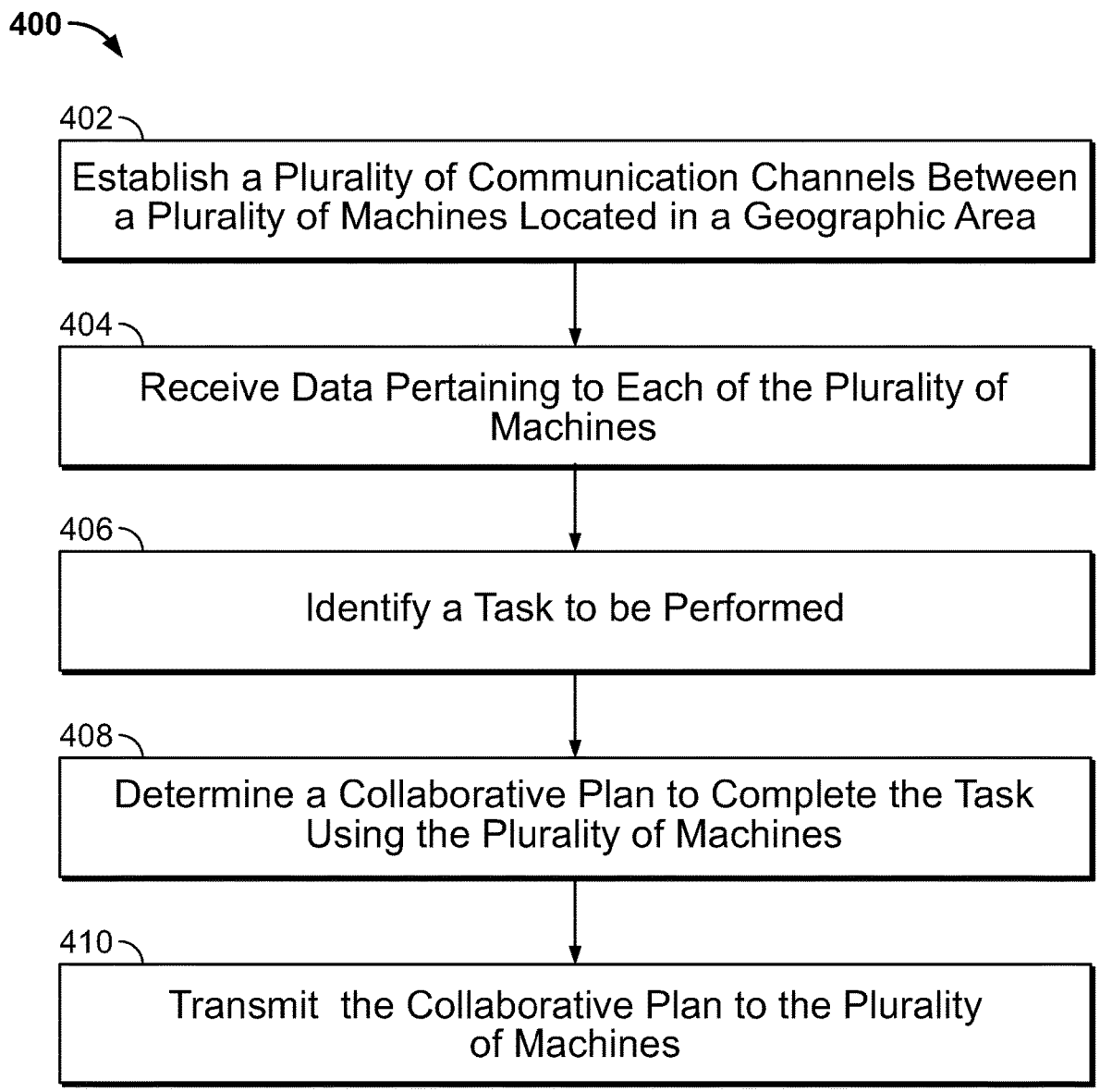
FIG. 4 shows a flow chart of a method for farming according to an embodiment.

Coordination among machines requires communication among those machines. Because of the mobility of the machines, communication among the machines is wireless. In one embodiment, communication among machines is facilitated by each machine communicating via a device to devices of other machines within range of a wireless transceiver of each device. A collaborative plan for a plurality of machines to complete a task (e.g., farming, construction, surface modification, etc.) can be determined by a device located one of the plurality of machines. A collaborative plan can also be determined by using two or more of the devices associated with the plurality of machines (e.g., distributed computing). Alternatively, a collaborative plan can be determined by a computing device located remote from each of the plurality of machines. For example, a computer that is in wireless communication with one or more of the plurality of machines can determine a collaborative plan. FIG. 4 depicts a flowchart of method 400 for MMCF. At step 402, a plurality of communication channels between a plurality of machines located in a geographic area are established. Machines, such as agricultural or construction machines, typically have trouble communicating over significant distances and cannot transmit through obstacles.

FIG. 5 shows device 502 which includes a transceiver and is associated with an agricultural machine. Device 502 has signal range 520 which is the furthest distance at which device 502 can communicate with one of the other devices via one of a plurality of communication channels between device 502 and one of the other devices. In one embodiment, the signal range of device 502 is fixed (e.g., device 502 can communication in a range of approximately 3 kilometers). Device 502 is shown in FIG. 5 as having established a communication channel with each device 504, 506, 508, 510, and 512 within signal range 520 of device 502. Devices 514, 516, and 518 are located outside signal range 520 and device 502 is unable to establish a communication channel with each of those devices. In one embodiment, device 502 is also in communication with cloud 500 which, in one embodiment, is one or more computers located remote from device 502. In one embodiment, the area in which all of the devices that are in communication with each other are located is referred to as a geographic area. In one embodiment, the range of a particular device can be extended by using a plurality of additional devices located remote from the particular device.

FIG. 6 depicts an MMCF network which is also referred to as a graph. The graph includes the set of all connections among devices. FIG. 6 shows device 502 having signal range 520 and device 516 having signal range 530. Devices 506, 508, and 510 are located within signal range of both devices 502 and 516 and allow devices 502 and 516 to communicate despite their being outside of each other's signal range. Devices 502 and 516 are not within range (e.g., 3 kilometers) of each other and, as such, cannot communicate with each other directly. However, devices 502 and 516 can communicate with each other by transmitting information to each other via one or more of devices 506, 508, and 510 which are in range of both 502 and 516. The communication channels between multiple devices allow communication between two devices via a third device in situations where it is determined that the two devices cannot directly communicate with each other due to distance or physical obstruction.

Returning to FIG. 4, at step 404, after the communication channels are established, data pertaining to each of the plurality of machines located in the area is received by each device in the MMCF network. That is, data is transmitted from each device and received by each device in the MMCF network. The data can include machine functional capabilities such as operations that the machine can perform (e.g., harvest, liquid application, solid application, seed distribution/planting, etc.) The data can also include information pertaining to physical aspects of each machine and/or implement details such as a width of an implement, width of a machine, speed of a machine, machine restrictions (e.g., slope of ground, etc.), machine location, coverage application, task parameters, etc. The data can also include information pertaining to a quantity, a quality, and/or a type of physical, tangible resources available to each of the plurality of machines. For example, the data can pertain to fuel, grain, pesticide, etc. associated with the machine. The data is transmitted from each device and received by each device in a MMCF network.

FIG. 7 shows how devices are connected to a source device. A source device is a device that is currently transmitting to other devices. As such, each device in an MMCF network can be a source device. In one embodiment, devices are connected to a source device via the least number of other devices. The number of devices used to connect a device to a source device is known as a hop count. As shown in FIG. 7, there is a hop count of one from source device 502 to each of devices 504, 506, 508, 510, and 512. There is a hop count of two from source device 502 to devices 514 and 516 because data must travel from source device 502 through one of devices 506 or 508 to be received by device 514 and from source device 502 through one of devices 508 and 510 to be received by device 516. There is a hop count of three from source device 502 to device 518 because data must travel through one of devices 506, 508, or 510 and then through one of devices 514 or 516 to be received by device 518. It should be noted that each device in an MMCF network can be a source device and transmit data to other devices. The MMCF network must account for devices that stop communicating or become otherwise unavailable in order to maintain the network.

Figure 8:
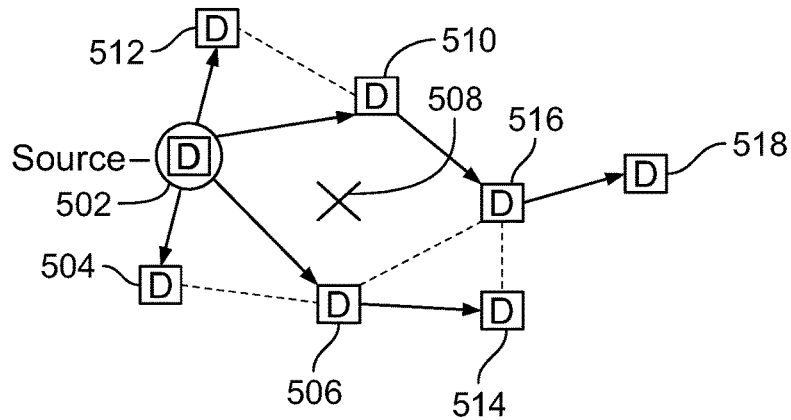
FIG. 8 shows a network that has been repaired in response to a device becoming unavailable.

FIG. 8 shows how an MMCF network repairs itself in response to determining that a device that has stopped communicating. Device 508 was in communication with other devices, such as devices 502, 504, 506, 510, 512, 514, 516, and 518. Device 508 is shown in FIG. 8 represented by an "X" indicating that it has stopped communicating with other devices. Devices 502, 504, and 512 are no longer able to communicate with device 508 or communicate with other devices via device 508. Devices 502, 504, and 512 can communicate with devices 514, 516, and 518 via devices 506 and 510 instead of device 508. If a device begins communicating or becomes operational again, it can be added to an existing MMCF network. Similarly, multiple disjoint MMCF networks can be formed if there are no devices connecting the disjoint networks.

Figure 9:
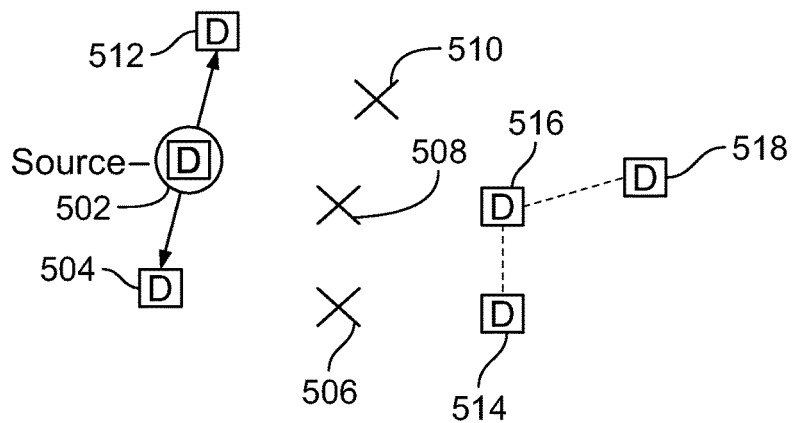
FIG. 9 shows disjoint networks that can be connected if they move closer together or use a cloud based bridge node.

FIG. 9 shows two disjoint MMCF networks that cannot currently connect to one another. Devices 502, 504, and 512 form a first network that is not currently in communication with devices 514, 516, and 518 that form a second network. If any of devices 514, 516, or 518 begins or resumes communicating with other devices, the first and second disjoint networks can be joined together. Similarly, if the devices of the first and second disjoint networks cannot communicate with any of devices 514, 516, or 518 because they are too far away from those devices, the networks can be joined when at least two of the devices are within range of each other. The ranges at which devices can communicate can be based in part on the type of network the devices use to communicate.

The bandwidth of data transmission between the devices is limited. In one embodiment, both a subscription model and a request-receive model is used for communications among the devices in order to lower bandwidth demand. This is important for maximizing the value of the limited bandwidth expected. For example, consider devices A, B & C. Device A is producing streams of data for resources X, Y, & Z. The communication channel between devices A, B & C becomes saturated at some data rate R. The data rate of the streams for resources X, Y & Z are represented by Rx, Ry & Rz respectively, and Rx+Ry+Rz>R. In this case, it is not possible for device A to communicate the data for all resources. The subscription model permits the devices B & C to register with device A which resources they require. If B & C subscribe only to X, then A only has to transmit Rx<R automatically. This data arrives at B & C with minimal latency. If B or C have need of the current state of Y, but do not need continuous updates on the state of Y, B or C may request using the request-receive model on a singular occasion. There is inherent latency as B or C have not received new information for Y at the exact point that it changed, but this is appropriate in cases for resources of lower priority or importance, and preserves bandwidth availability for higher priority resource X.

Consider the case as above, and assume that Rx+Ry<R. Also assume that C is not within communication range of A, and must communicate via device B, which is in communication range of both A & C. If C requires resource Y, it cannot request a subscription from A as it is not in communication range. Instead, it may request a subscription from B, which in turn must request a subscription for Y from A.

Figure 10:
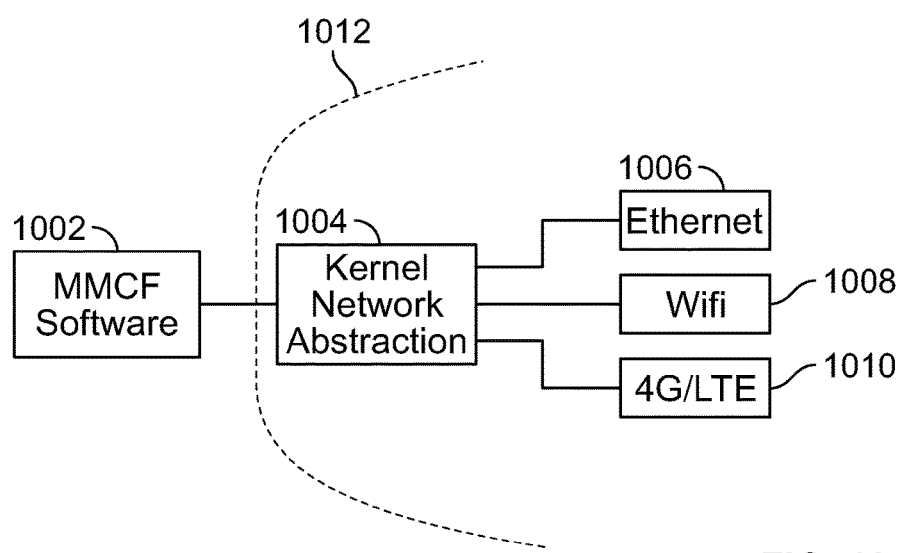
FIG. 10 shows MMCF software communicating using an abstraction.

FIG. 10 shows how a device of a multi-machine collaborative farming network can communicate via different networks. In one embodiment, MMCF software 1002 is executed by a device associated with an agricultural machine. MMCF software 1002 is network interface agnostic and uses kernel network abstraction 1004 in order to communicate via one or more of Ethernet 1006, WiFi 1008, or 4G/LTE 1010 located in network 1012. Kernel network abstraction 1004 can communicate using other types of network protocols as well. For example, in one embodiment, when connections between devices cannot be established via normal communication channels, the devices can communicate with each other using a cloud based bridging node which is software that acts like a device and allows devices that cannot connect due to distance to connect via the bridging node.

Returning to FIG. 4, at step 406 a task to be performed is identified. In one embodiment, a user identifies a task to be performed at one of the devices of an MMCF network. For example, a user can identify using one of the devices that the user wants a particular field to be harvested. In one embodiment, the potential tasks that can be completed are determined and presented to a user for selection via one of the devices. In one embodiment, the potential tasks that can be completed are determined based on the machines that are currently available to perform each task.

At step 408, a collaborative plan is determined to complete the identified task based on data received in step 404 pertaining to each of the plurality of machines and information related to the identified task. For example, if a harvesting task is selected, it is determined how many combine harvesters are available to perform the harvesting and a collaborative plan is determined for performing harvesting of a field based on the number of combine harvesters available.

Determining a collaborative plan, in one embodiment, is based on a location of each of the plurality of machines and the capabilities of each of the plurality of machines. For example, combine harvesters located near a field that needs to be harvested can be included in a collaborative plan to harvest the field while combine harvesters located far away from the field may not be included. The collaborative plan, in one embodiment, includes determining a plurality of operations for each of the plurality of machines. The plurality of operations can include determining a speed for each machine and an operation of an implement of each of the machines. In one embodiment, determining the path for each of the plurality of machines comprises determining a start time and a start location for each machine and a time period during which each machine should traverse its path.

In one embodiment, determining a collaborative plan to complete the task includes determining a spacing of the machines. Front-to-back spacing of the machines can be based on a speed of the machines, stopping ability of the machines, visibility from the cab of the machine, etc. Side-to-side spacing of the machines can be based on implement geometry and the task to be performed. For example, harvesting machines can overlap the portion of the field that they harvest while pesticide or fertilizer application machines should typically not overlap in order to prevent over application of material.

In one embodiment, a collaborative plan for a plurality of storage-capable machines (e.g., grain or harvest bins) is based on a collaborative plan for a plurality of harvesters. For example, a combine harvester can determine a collaborative plane for a plurality of combine harvesters to harvest a field. The collaborative plan for the combine harvesters can then be used to determine a collaborative plan for a plurality of storage-capable machines for receiving material harvested by the combine harvesters. The collaborative plan generated for the storage-capable machines uses information about the physical location & spacing of all machines, current capacity data of the combine harvesters and storage-capable machines, and instructs the storage-capable machines to follow the combine harvesters (in an automatic steering sense) so that harvested material can be unloaded in a somewhat optimal way. This embodiment can be used to minimize the downtime of the combine harvesters.

At step 410, the collaborative plan is transmitted from the device or devices that determined the collaborative plan to each device of the plurality of machines via each of a plurality of communication channels. In one embodiment, the plurality of machines are the machines that are to perform the identified task. Machines that will not perform the task may also receive the collaborative plan so that operators of those machines are aware of tasks being performed near their location. Each device for use in the MMCF network can store various information.

In one embodiment, the collaborative plan that is transmitted to each device of the plurality of machines is displayed to an operator of a respective machine so that the operator can operate the machine in accordance with the collaborative plan. In another embodiment, the collaborative plan is automatically performed by each machine involved with the collaborative plan. In one embodiment, the collaborative plan is accomplished by a combination of both automatic control of a machine as well as operator input. For example, a machine may be automatically controlled to perform a collaborative plan and an operator can override automatic operation of the machine when an unexpected situation occurs, such as unexpected hazardous terrain, an object that needs to be avoided, etc.

Figure 11:
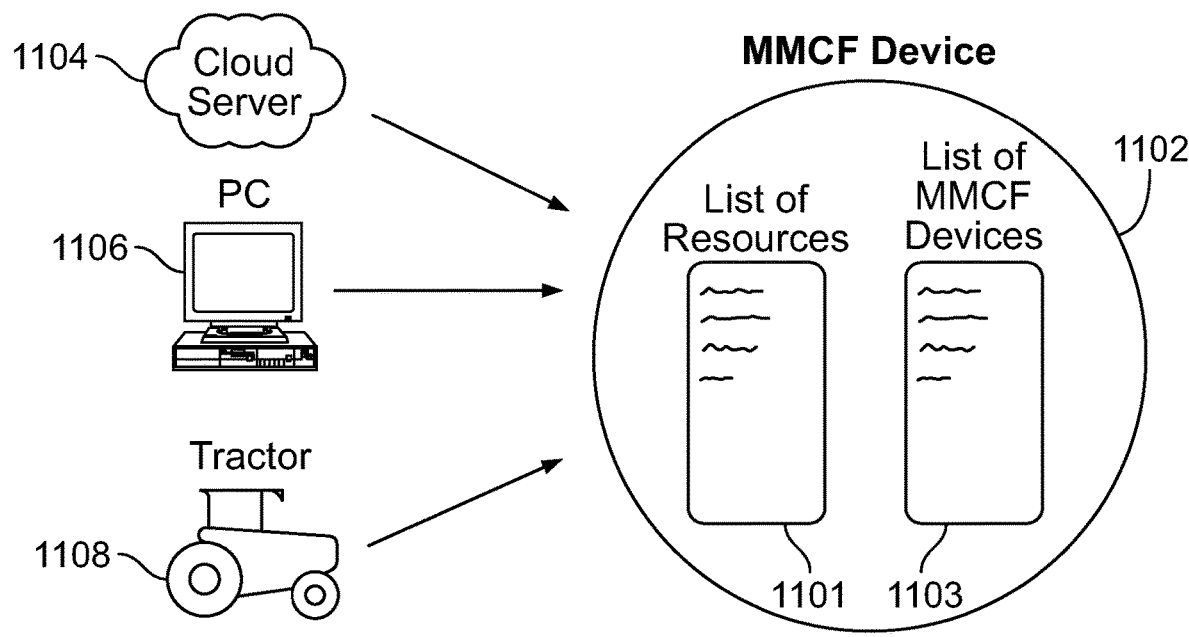
FIG. 11 shows the types of information stored in an MMCF device.

Devices that are capable of joining an MMCF network may be referred to as MMCF devices. FIG. 11 shows MMCF device 1102 storing a list of resources 1101 and a list of MMCF devices 1103. Each resource in the list of resources 1101 is a piece of information. For example, a resource can be vehicle location data, coverage application data, product data (e.g., fertilizer or pesticide). In one embodiment, list of MMCF devices 1103 includes identification of physical devices that are executing MMCF software. The information stored on MMCF device 1102 can be received from or transmitted to, or requested by, for example, various locations such as cloud server 1104, personal computer 1106, and/or tractor 1108.

Figure 12:
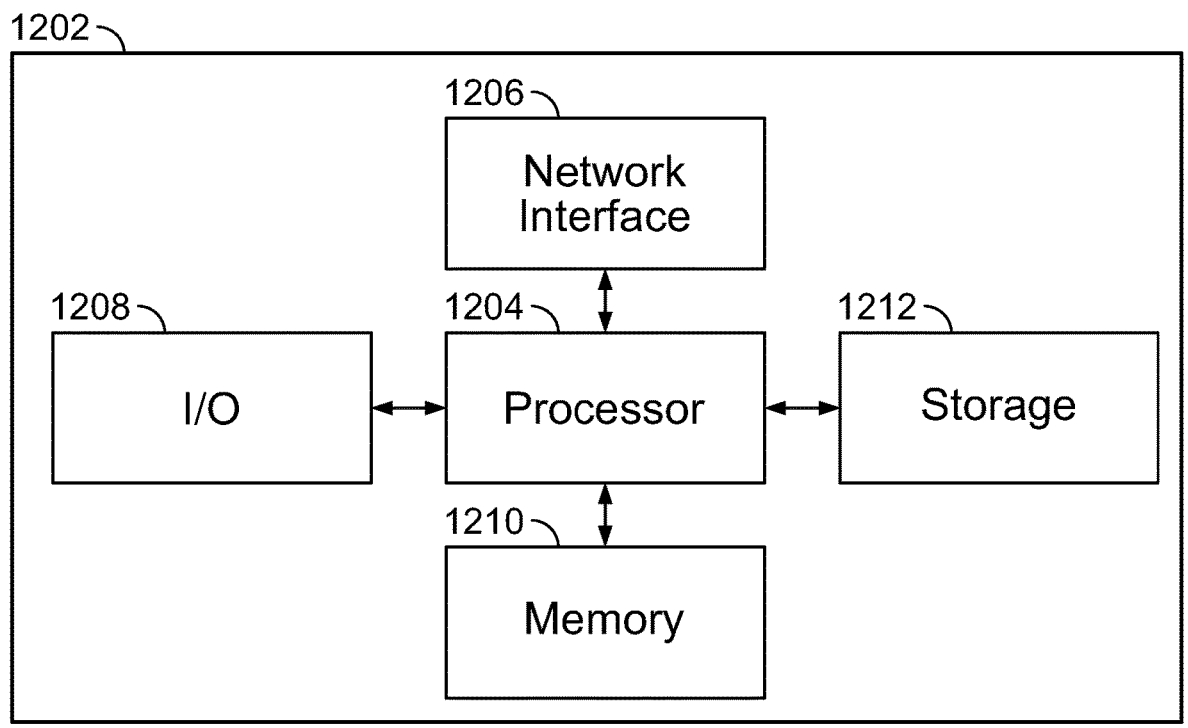
FIG. 12 shows a high level schematic of a computer for implementing various machines and devices described herein.

In one embodiment, various elements described above can be implemented using computers. A high-level block diagram of such a computer is illustrated in FIG. 12. Computer 1202 contains a processor 1204 which controls the overall operation of the computer 1202 by executing computer program instructions which define such operation. The computer program instructions may be stored in a storage device 1212, or other computer readable medium (e.g., magnetic disk, CD ROM, USB drive, SD card, etc.), and loaded into memory 1210 when execution of the computer program instructions is desired. Thus, the methods described above can be defined by the computer program instructions stored in the memory 1210 and/or storage 1212 and controlled by the processor 1204 executing the computer program instructions. For example, the computer program instructions can be implemented as computer executable code programmed by one skilled in the art to perform algorithms defined by the methods and functionality described above. Accordingly, by executing the computer program instructions, the processor 1204 executes an algorithm defined by the methods and functions described above. The computer 1202 also includes one or more network interfaces 1206 for communicating with other devices via a network. The computer 1202 also includes input/output devices 1208 that enable user interaction with the computer 1202 (e.g., display, keyboard, mouse, speakers, buttons, etc.) One skilled in the art will recognize that an implementation of an actual computer could contain other components as well, and that FIG. 12 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   establishing a plurality of communication channels between a plurality of devices, the plurality of devices using a subscription model and a request-receive model for communications among the plurality of devices in response to data streams from the plurality of devices exceeding available bandwidth, each of the plurality of devices associated with one of a plurality of agricultural machines located in a geographic area, each of the plurality of agricultural machines having functional capabilities, physical aspects, and a physical tangible resource, the establishing a plurality of communication channels comprising:
      determining that two of the plurality of devices cannot communicate with each other using either the subscription model or the request-receive model; and
      establishing a communication channel between the two devices using a third device that is in range of each of the two devices;
   receiving, by at least one of the plurality of devices located on one of the plurality of agricultural machines, data pertaining to the functional capabilities, the physical aspects, and a quantity, a quality, and a type of the physical tangible resource of each of the plurality of agricultural machines;
   determining, by the at least one of the plurality of devices, a collaborative plan to complete a task using the plurality of agricultural machines based on the received data and a location at which the task will be performed; and
   transmitting, from the at least one of the plurality of devices, at least a portion of the collaborative plan to each of the plurality of agricultural machines via the plurality of communication channels, the portion of the collaborative plan for controlling a respective one of the plurality of agricultural machines to perform its portion of the collaborative plan.

2. The method of claim 1, wherein the received data comprises:
   data pertaining to a location of each of the plurality of agricultural machines.

3. The method of claim 2, wherein the determining the collaborative plan further comprises:
   determining a plurality of operations for each of the plurality of agricultural machines.

4. The method of claim 3, wherein the determining a plurality of operations comprises:
   determining a path for each of the plurality of agricultural machines;
   determining a speed for each of the plurality of agricultural machines to traverse its respective path; and
   determining operation of an implement of each of the plurality of agricultural machines.

5. The method of claim 4, wherein the determining the path for each of the plurality of agricultural machines comprises:
   determining a start time and a start location for each of the plurality of agricultural machines to begin its respective operation.

6. The method of claim 5, wherein the determining the path for each of the plurality of agricultural machines comprises:
determining a period of time for each of the plurality of agricultural machines to complete its path.

7. The method of claim 1, wherein the third device is one of the plurality of devices.

8. The method of claim 1, wherein the third device is separate from the plurality of devices.

9. An apparatus comprising:
a processor; and
a memory to store computer program instructions, which, when executed by the processor cause the processor to perform operations comprising:
establishing a plurality of communication channels between a plurality of devices, the plurality of devices using a subscription model and a request-receive model for communications among the plurality of devices in response to data streams from the plurality of devices exceeding available bandwidth, each of the plurality of devices associated with one of a plurality of agricultural machines located in a geographic area, each of the plurality of agricultural machines having functional capabilities, physical aspects, and a physical tangible resource, the establishing a plurality of communication channels comprising:
determining that two of the plurality of devices cannot communicate with each other using either the subscription model or the request-receive model; and
establishing a communication channel between the two devices using a third device that is in range of each of the two devices;
receiving data pertaining to the functional capabilities, the physical aspects, and a quantity, a quality, and a type of the physical tangible resource of each of the plurality of agricultural machines;
determining a collaborative plan to complete a task using the plurality of agricultural machines based on the received data and a location at which the task will be performed; and
transmitting at least a portion of the collaborative plan to each of the plurality of agricultural machines via the plurality of communication channels, the portion of the collaborative plan for controlling a respective one of the plurality of agricultural machines to perform its portion of the collaborative plan.

10. The apparatus of claim 9, wherein the received data comprises:
data pertaining to a location of each of the plurality of agricultural machines.

11. The apparatus of claim 10, wherein the determining the collaborative plan further comprises:
determining a plurality of operations for each of the plurality of agricultural machines.

12. The apparatus of claim 11, wherein the determining a plurality of operations comprises:
determining a path for each of the plurality of agricultural machines;
determining a speed for each of the plurality of agricultural machines to traverse its respective path; and
determining operation of an implement of each of the plurality of agricultural machines.

13. The apparatus of claim 12, wherein the determining the path for each of the plurality of agricultural machines comprises:
determining a start time and a start location for each of the plurality of agricultural machines to begin its respective operation.

14. The apparatus of claim 13, wherein the determining the path for each of the plurality of agricultural machines comprises:
determining a period of time for each of the plurality of agricultural machines to complete its path.

15. The apparatus of claim 9, wherein the third device is one of the plurality of devices.

16. The apparatus of claim 9, wherein the third device is separate from the plurality of devices.

17. A non-transitory computer readable medium storing (Currently Amended) computer program instructions, which, when executed on a processor cause the processor to perform operations comprising:
establishing a plurality of communication channels between a plurality of devices, the plurality of devices using a subscription model and a request-receive model for communications among the plurality of devices in response to data streams from the plurality of devices exceeding available bandwidth, each of the plurality of devices associated with one of a plurality of agricultural machines located in a geographic area, each of the plurality of agricultural machines having functional capabilities, physical aspects, and a physical tangible resource, the establishing a plurality of communication channels comprising:
determining that two of the plurality of devices cannot communicate with each other using either the subscription model or the request-receive model; and
establishing a communication channel between the two devices using a third device that is in range of each of the two devices;
receiving data pertaining to the functional capabilities, the physical aspects, and a quantity, a quality, and a type of the physical tangible resource of each of the plurality of agricultural machines;
determining a collaborative plan to complete a task using the plurality of agricultural machines based on the received data and a location at which the task will be performed; and
transmitting at least a portion of the collaborative plan to each of the plurality of agricultural machines via the plurality of communication channels, the portion of the collaborative plan for controlling a respective one of the plurality of agricultural machines to perform its portion of the collaborative plan.

18. The non-transitory computer readable medium of claim 17, wherein the received data comprises:
data pertaining to a location of each of the plurality of agricultural machines.

19. The non-transitory computer readable medium of claim 18, wherein the determining the collaborative plan further comprises:
determining a plurality of operations for each of the plurality of agricultural machines.

20. The non-transitory computer readable medium of claim 17, wherein the third device is one of the plurality of devices.

21. The non-transitory computer readable medium of claim 17, wherein the third device is separate from the plurality of devices.

* * * * *